(No Model.)

I. CHURCH.
EXPANSION BOLT DEVICE.

No. 406,564. Patented July 9, 1889.

Witnesses;
O. J. Hopkins,
N. B. Bacon

Inventor;
Isaac Church

UNITED STATES PATENT OFFICE.

ISAAC CHURCH, OF TOLEDO, OHIO.

EXPANSION-BOLT DEVICE.

SPECIFICATION forming part of Letters Patent No. 406,564, dated July 9, 1889.

Application filed July 21, 1887. Serial No. 244,857. (No model.)

*To all whom it may concern:*

Be it known that I, ISAAC CHURCH, of the city of Toledo, county of Lucas, and State of Ohio, have invented certain new and useful Improvements in the Construction of Expansion-Bolts; and I hereby declare that the following is a full and correct description thereof, reference being had to the accompanying drawings and the letters of reference marked thereon.

My invention relates to expanding bolts, and has for its object to provide means for expanding wedges arranged upon the inclined surface of the nut, by a movement of the same, when the bolt is being screwed to place.

The invention consists of the parts and combination of parts hereinafter described, and pointed out in the claims.

Figure 1:
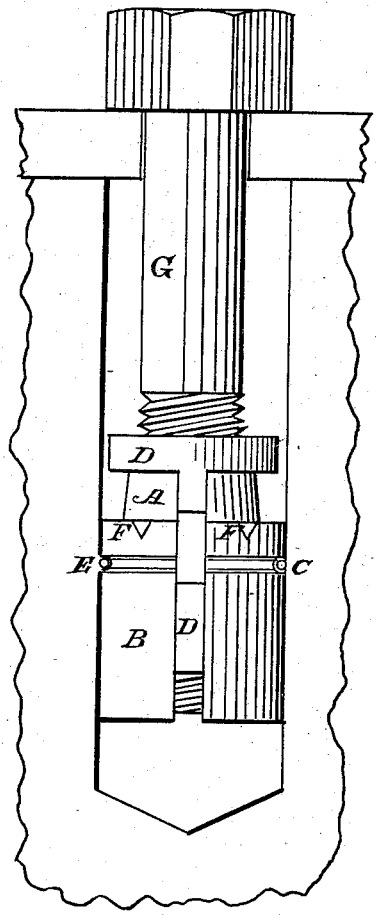
Figure 4:
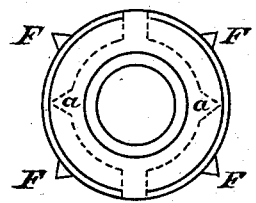
Figure 2:
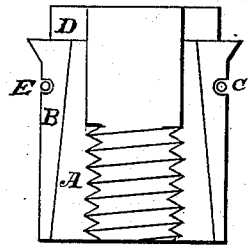
Figure 5:
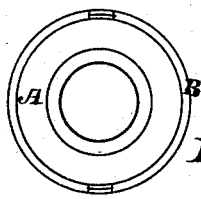
Figure 3:
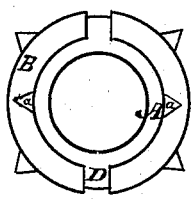

In the drawings, Figure 1 is an elevation showing the bolt as applied in practical operation. Fig. 2 is a longitudinal section through the nut and expanding wedges. Fig. 3 is a cross-section through the nut and expanding wedges. Figs. 4 and 5 are plan views of the rear and front ends, respectively, of the nut and expanding wedges.

A is the main body of the internally-screw-threaded nut, formed with a collar D at the rear end and with diametrically oppositely-arranged ribs D, of a height corresponding to the diameter of the collar. The intermediate space upon the nut between the ribs is inclined from the collar to the front end thereof, as shown in section in Fig. 2, and upon each inclined surface is placed an oppositely-inclined semicircularly-formed wedge B, each of which has a groove C, into which is fitted a wire or spring ring E, to hold the wedges closely assembled to the nut.

The ribs D are cut away, as shown in Fig. 1, to allow the ring or wire to move thereon when the nut is being drawn from the wedges to expand the same.

F designates projecting studs formed upon the rear end of each wedge B, and designed to hold the same from longitudinal or rotary movement, as will be more fully explained.

G is the bolt, which may be of any preferred form, so that the thread of the same corresponds with the thread of the nut A.

In operation, should it be desired to attach a timber to a wall or an iron to stone or brick work, a cavity is first formed in the wall or stone and the nut is placed therein with the wedges bearing against the sides of the cavity. The bolt is then passed through the timber, iron, or other article, and the threaded end of the bolt screwed into the nut, when, upon screwing the bolt into the nut sufficiently to draw the inclined portion against the inversely-inclined inner sides of the wedges, the latter are expanded within the cavity to cause the sides of the wedges to bind against the sides of the cavity and at the same time cause studs F to penetrate the same, thereby not only preventing the nut and wedges from turning, but effectually locking the nut within the cavity. Centrally of the width of the wedges and running longitudinally thereof are formed V-shaped grooves $a$, for the purpose of giving flexibility to the wedge when caused to describe the arc of a circle of larger radius than the normal circle as constructed, caused by the increasing diameter of the nut as it is being drawn from the wedges.

The nut may be constructed with circular inclined recesses containing balls slightly projecting beyond the face of the nut, or with rollers or cams. The nut may also be constructed with the sliding wedge lipped or hooked over the end of the nut, thereby dispensing with the recess. I prefer, however, the construction described with one or more recesses and one or more wedges.

What I claim is—

1. A bolt, a threaded nut upon the bolt, formed with inclined outer sides, and supplemental wedges movable upon the same, as and for the purpose set forth.

2. A bolt, a threaded nut upon the bolt, formed with an annular collar and right angled ribs, semicircular inclined surfaces between the ribs, and semicircular wedges movably secured upon the inclined surfaces, as and for the purpose set forth.

3. A bolt and a threaded nut upon the bolt, formed with diametrically-opposite inclined surfaces, in combination with oppositely-inclined wedges movably secured upon the inclined surfaces of the nut, as and for the purpose set forth.

4. A bolt and a threaded nut upon the bolt, formed with inclined surfaces, in combination with wedges movably secured upon the nut and provided with projecting studs upon the outer side thereof, as and for the purpose set forth.

ISAAC CHURCH.

Witnesses:
O. J. HOPKINS,
N. B. BACON.